United States Patent
Fuller et al.

(10) Patent No.: US 8,007,583 B2
(45) Date of Patent: *Aug. 30, 2011

(54) MULTI-LAYER EFFECT PIGMENT

(75) Inventors: Daniel J. Fuller, Beacon, NY (US); Curtis J. Zimmermann, Cold Spring, NY (US)

(73) Assignee: BASF Corporation, Florham Park, NJ (US)

(*) Notice: Subject to any disclaimer, the term of this patent is extended or adjusted under 35 U.S.C. 154(b) by 1459 days.

This patent is subject to a terminal disclaimer.

(21) Appl. No.: 11/056,560

(22) Filed: Feb. 12, 2005

(65) Prior Publication Data

US 2005/0166799 A1 Aug. 4, 2005

Related U.S. Application Data

(63) Continuation-in-part of application No. 10/346,076, filed on Jan. 17, 2003, now Pat. No. 6,875,264.

(51) Int. Cl.
*C04B 2/00* (2006.01)
*C04B 14/04* (2006.01)
*C09C 1/36* (2006.01)

(52) U.S. Cl. ......... 106/446; 106/415; 106/436; 106/482

(58) Field of Classification Search .................. 106/446, 106/415, 436, 482
See application file for complete search history.

(56) References Cited

U.S. PATENT DOCUMENTS

| | | | |
|---|---|---|---|
| 3,627,553 A | 12/1971 | Clark et al. | |
| 4,434,010 A | 2/1984 | Ash | 106/291 |
| 5,456,749 A | 10/1995 | Iwasa et al. | 106/417 |
| 6,132,873 A | 10/2000 | Dietz et al. | |
| 6,280,520 B1 | 8/2001 | Andes et al. | |
| 6,451,294 B1 | 9/2002 | Simon | |
| 6,500,251 B1 | 12/2002 | Andes | 106/436 |
| 6,517,628 B1 | 2/2003 | Pfaff et al. | 106/417 |
| 6,596,070 B1 | 7/2003 | Schmidt et al. | |
| 6,656,259 B2 | 12/2003 | Pfaff et al. | |
| 6,663,852 B2 | 12/2003 | Simon | |
| 6,689,205 B1 | 2/2004 | Bruckner et al. | 106/415 |
| 6,719,838 B2 | 4/2004 | Heider et al. | 106/417 |
| 6,875,264 B2 * | 4/2005 | Zimmermann et al. | 106/446 |
| 2002/0104461 A1 | 8/2002 | Schmidt et al. | |
| 2004/0052743 A1 | 3/2004 | Schmidt et al. | 424/63 |
| 2004/0134385 A1 | 7/2004 | Anselmann et al. | |
| 2004/0170838 A1 | 9/2004 | Ambrosius et al. | 428/406 |

FOREIGN PATENT DOCUMENTS

| | | |
|---|---|---|
| JP | 7-246366 | 9/1995 |
| WO | WO 98/53011 | 11/1998 |
| WO | WO 98/53012 | 11/1998 |
| WO | WO 02/090448 | 11/2002 |
| WO | WO 03/006558 | 1/2003 |

OTHER PUBLICATIONS

"TIMIRON Product Brochure" dated May 18, 1999 (filed with U.S. Appl. No. 10/346,076).
Engelhard's "REFLECKS(TM) Pearlescent and Iridescent Pigments" re: Effect enhancers for cosmetics and personal care dated 2000 (filed with U.S. Appl. No. 10/346,076).
Engelhard's "Effect enhancers for cosmetics and personal care" price list effective Jul. 1, 2001 (filed with U.S. Appl. No. 10/346,076).
"Rona Basics of Success—Ingredients for Cosmetics" Publication by Merck KGaA, Darmstadt, W502153, Jul. 2004.

* cited by examiner

*Primary Examiner* — Elizabeth Wood
(74) *Attorney, Agent, or Firm* — Bernard Lau

(57) ABSTRACT

A multilayer effect pigment includes a transparent substrate, a layer of high refractive index material on the substrate, and alternating layers of low refractive index and high refractive index materials on the first layer, the total number of layers being an odd number of at least three, all adjacent layers differing in refractive index by at least about 0.2 and at least one of the layers having an optical thickness which is different from all of the other layers. The resulting multilayer effect pigment is not a quarter-wave stack. The present effect pigments may be used in cosmetic and industrial applications.

1 Claim, No Drawings

MULTI-LAYER EFFECT PIGMENT

This application is a continuation-in-part of U.S. Ser. No. 10/346,076, filed Jan. 17, 2003, now U.S. Pat. No. 6,875,264, issued Apr. 5, 2005.

BACKGROUND OF THE INVENTION

Effect pigments, also known as pearlescent or nacreous pigments, are based on the use of a laminar substrate such as mica or glass flake which has been coated with a metal oxide layer. These pigments exhibit pearl-like luster as a result of reflection and refraction of light, and depending on the thickness of the metal oxide layer, they can also exhibit interference color effects.

Titanium dioxide-coated mica and iron oxide-coated mica effect pigments are the effect pigments which are encountered most often on a commercial basis. Pigments in which the metal oxide has been over-coated with another material are also well known in the art.

The commercially available effect pigments which contain only a single coating of a high refractive index material provide only two reflecting interfaces between materials. These two material interfaces (and reflections) are therefore solely responsible for the reflectivity achieved from the platelet surface. A substantial percentage of the incident light is thus transmitted through the platelet and while this is necessary to create the nacreous appearance of the pigment, it also diminishes other desirable properties of the effect pigments such as luster, chromaticity and hiding power. To counteract this consequence, the art has either mixed the effect pigments with other pigments or added additional layers of transparent and/or selectively absorbing materials onto the effect pigment.

Examples of prior art describing multi-coated effect pigments include JP 7-246366, WO 98/53011, WO 98/53012 and U.S. Pat. No. 4,434,010. All of such prior art requires that each coated layer possess an optical thickness equal to a whole number multiple of a one-quarter of the wave-length at which interference is expected. Such construction of the so-called quarter-wave stacks is a widely accepted and implemented condition in the thin-film industries. Because of this limitation, a unique layer thickness combination is essential in order to create each individual one of the interference colors of the visible spectrum. The base substrate is the only dimension common to all of the compositions displaying different interference colors.

It has now been discovered that the adherence to the quarter-wave stack approach is unnecessary and suitable products, even with substantial gains in luster, chromaticity and hiding power, can be achieved without observing that requirement. Further, numerous other advantages can be realized.

It is accordingly the object of this invention to provide a new multi-layer effect pigment, including having improved luster, chromaticity and/or hiding power relative to other effect pigments.

SUMMARY OF THE INVENTION

This invention relates to a multi-layer effect pigment and more particularly, to a multi-layer effect pigment which includes a transparent substrate having a transparent high refractive index material layer thereon and at least one pair of layers which are a transparent high refractive index material and a transparent low refractive index material, in which the total number of layers is an odd number, in which every two adjacent non-substrate layers differ in refractive index by at least about 0.2 and in which at least one layer has an optical thickness which is different from all of the other layers, whereby the pigment is not a quarter-wave stack.

The present invention provides a multilayer effect pigment comprising: a transparent substrate having a first layer of titanium dioxide thereon, the first layer having a thickness of about 35 to 160 nm, a second layer of a low refractive index material on the first layer and an outermost layer of a high refractive index material placed on the second layer, the high refractive index material comprises titanium dioxide having a thickness of from about 20 to 175 nm and the low refractive index material is silicon dioxide having a thickness of about 20 to 80 nm, and wherein at least one layer has an optical thickness which is different from all of the other layers, whereby the pigment is not a quarter-wave stack.

DESCRIPTION OF THE INVENTION

In accordance with the present invention, the effect pigment is a multi-layered product composed of a transparent substrate having an odd number of layers thereon and in which at least one of the layers has an optical thickness which is different from all of the other layers causing the pigment not to be a quarter-wave stack.

Any encapsulatable smooth and transparent platelet can be used as the substrate in the present invention. Examples of useable platelets include mica, whether natural or synthetic, kaolin, glass flakes and the like. The substrate need not be totally transparent but should, preferably, have at least about 75% transmission. The size of the platelet shaped substrate is not critical per se and can be adapted to the particular use. Generally, the particles have largest major dimensions averaging about 5-250 microns, preferably 5-100 microns, and an aspect ratio greater than about 5. Their specific free surface area (BET) is, in general, from about 0.2 to 25 $m^2/g$.

The layers encapsulating the substrate alternate between high refractive index materials and low refractive index materials. The high refractive index materials can be anatase titanium dioxide, rutile titanium:dioxide, iron oxide, zirconium dioxide, zinc oxide, zinc sulfide, bismuth oxychloride or the like. The low refractive index material can be silicon dioxide, magnesium fluoride, aluminum oxide, a polymer such as polymethyl methacrylate, polystyrene, ethylene vinyl acetate, polyurea, polyurethane, polydivinyl benzene and the like. Any combination of materials can be selected provided that adjacent layers differ in refractive index by at least about 0.2, and more preferably at least about 0.6. The materials are transparent but may, like iron oxide and chromium oxide, have an absorption component.

The individual layers can be applied to the substrate and to each other using techniques well known in the art. Any such technique can be utilized. One of the advantages of the invention is that sol-gel techniques can be used to apply the coatings. Such techniques are well known and widely practiced for thin film deposition, and are safe, economical and amenable to a wide variety of particle shapes and sizes. Chemical vapor deposition techniques which have been used in some prior art have a litany of negative aspects including safety hazards, expensive reagents and infrastructure and substrate particle size limitations. Monolithic web-based multi-layer coating techniques have also been used in the prior art and suffer from the disadvantages that pigment particles are formed after the coatings are applied and therefore have discontinuities in the layers at the fracture points. The particles must also be classified according to size after the monolith is fractured, whereas in the present invention the particle size can be predetermined before the coating and can be constant.

Another advantage of the present invention is that the substrate and all layers have an appreciable degree of transparency and therefore the resulting pigments can exhibit unique angle dependent reflectivity ranging from nearly totally reflecting to substantially transmitting as the viewing angle is changed. Many multi-coated pigments in the prior art use metal flakes as substrates and such metal layers are not capable of transmitting light and the resulting pigment is therefore totally opaque.

Because the pigment is not a quarter-wave stack, the first layer which is adjacent the substrate can be given a fixed thickness and by varying the thickness of the other layers, it is possible to prepare all of the interference colors desired.

While any odd number of layers equal to or greater than three can be employed, it has been found that substantial advantages are present when there are three layers and this is therefore preferred.

The low refractive index is preferably silica and while this can have other thicknesses, the silica layer preferably has a thickness in the range of about 20-80 nm, and more preferably about 40-80 nm. This minimizes the degree of angle dependent color travel, which is inherent in silica films. Silica layers which have a thickness greater than 80 nanometers produce a wider range of angle dependent colors which is not always desirable.

The first layer on the substrate and the outermost layer can be the same or different, but are preferably the same, and are further preferably titanium dioxide. It will be appreciated that where the first or innermost layer has a fixed thickness and the low refractive index layer also has a predetermined thickness, the outermost high refractive index layer will control the interference color as a result of its thickness. The substrate/first layer/second layer combination thus acts as a universal base from which all interference colors can be realized by simply varying the thickness of the third layer. The thickness of the third layer, when it is titania, in such an arrangement generally varies from about 20 to 250 nm, and preferably about 60-175 nm. Preferably, the first layer will have a thickness of from about 35 to 160 nm.

While the approach of using a universal substrate/first layer/second layer base yields products superior to single-layer $TiO_2$-coated substrates, optimum pigments of this invention can be derived by employing a variety of unique thickness combinations. Examples of such products are provided in Table 2 below.

It is further part of the present invention that the pigments have first and outermost layers which have different thicknesses from each other and still yield the unexpected color which has been achieved by these materials which do not follow the standard quarter-wave theory. Moreover, the $TiO_2$ layers may have the same thickness. In such case, it is the optical thickness of the low refractive index layer, e.g., $SiO_2$, which provides the non-quarter wave stack. The most useful pigments of this invention will have a chromacity (0° C.*) of at least 40.0.

The products of the present invention can be used in any application where pearlescent pigments have been used heretofore. Thus, the products of this invention have an unlimited use in all types of automotive and industrial paint applications, especially in the organic color coating and inks field where deep color intensity is required. For example, these pigments can be used in mass tone or as styling agents to spray paint all types of automotive and non-automotive vehicles. Similarly, they can be used on all clay/formica/wood/glass/metal/enamel/ceramic and non-porous or porous surfaces. The pigments can be used in powder coating compositions. They can be incorporated into plastic articles geared for the toy industry or the home. These pigments can be impregnated into fibers to impart new and esthetic coloring to clothes and carpeting. They can be used to improve the look of shoes, rubber and vinyl/marble flooring, vinyl siding, and all other vinyl products. In addition, these colors can be used in all types of modeling hobbies.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a well-rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282-591; with regard to paints: C. H. Hare, Protective Coatings, Technology Publishing Co., Pittsburgh (1994), particularly pages 63-288. The foregoing references are hereby incorporated by reference herein for their teachings of ink, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an automotive paint formulation along with other pigments which may include titanium dioxide, acrylic lattices, coalescing agents, water or solvents. The pigment may also be used, for example, at a level of 20 to 30% in a plastic color concentrate in polyethylene.

In the cosmetic and personal care field, these pigments can be used in the eye area and in all external and rinse-off applications. They are restricted only for the lip area. Thus, they can be used in hair sprays, face powder, leg-makeup, insect repellent lotion, mascara cake/cream, nail enamel, nail enamel remover, perfume lotion, and shampoos of all types (gel or liquid). In addition, they can be used in shaving cream (concentrate for aerosol, brushless, lathering), skin glosser stick, skin makeup, hair groom, eye shadow (liquid, pomade, powder, stick, pressed or cream), eye liner, cologne stick, cologne, cologne emollient, bubble bath, body lotion (moisturizing, cleansing, analgesic, astringent), after shave lotion, after bath milk and sunscreen lotion.

The present effect pigments may also be used in combination with food or beverages or to coat foods.

In order to further illustrate the invention, various examples are set forth below. In these examples, as well as throughout this specification and claims, all parts and percentages are by weight and all temperatures are in degrees Centigrade, unless otherwise indicated.

EXAMPLE 1

Into a 1 liter Morton flask is added a solution of 420 ml of isopropanol, 32 ml of distilled water and 4 ml of a 29% $NH_4OH$ aqueous solution. To this stirred solution is added 300 grams of a white reflecting TiO$_2$ coated glass flake powder (G130L, REFLECKS™ Pinpoints of Pearl, Engelhard Corporation). The resulting suspension is stirred and heated to 60° C.

A charge of 33.2 grams of tetraethoxysilane is added to the suspension, which is stirred for 18 hours. The suspension is then vacuum filtered, and the presscake dried in a 120° C. oven for 16 hours. The yield of the dried product is 307.4 grams, and the bulk color is a weak red which is not visible in the reaction suspension.

Into a 2 liter Morton flask equipped with heating, stirring, and temperature control is added 550 ml of demineralized water and 278 grams of silica coated intermediate prepared above. The stirring suspension pH is adjusted to 1.5, and the temperature set at 79° C. While maintaining the pH at 1.5, 16.7 grams of an 18% SnCl$_4$5H$_2$O solution is added at a constant rate over 60 minutes, and then the suspension is stirred at the temperature and pH set points for 30 minutes beyond the addition. While maintaining the pH at 1.5, and the temperature at 79° C., 50 ml of a 40% TiCl$_4$ aqueous solution is then added over 60 minutes. The suspension is filtered, and the presscake rinsed with water and dried for 16 hours at 120° C. The yield of final product is 315 grams.

A small portion (5 grams) of the final TiO$_2$ coated product is calcined at 600° C. for 20 minutes. Both the 120° C. dried product and the 600° C. calcined product is compared to the singly coated starting material (G130L, Engelhard Corporation) as drawdowns of 12% powder in nitrocellulose lacquer. The reflectivity of all the samples is evaluated both visually and instrumentally. A large increase in the reflectivity is imparted to the G130L starting material by the application of the 2 additional coatings.

EXAMPLE 2

Into a 2 liter Morton flask is added a solution of 900 ml of isopropanol, 190 ml of distilled water, and 17 ml of a 29% NH$_4$OH aqueous solution. To this stirred solution is added 300 grams of a white reflecting TiO$_2$ coated mica powder (TIMICA® sparkle, 110P, Engelhard Corporation).

A charge of 176.8 grams of tetraethoxysilane is added to the 60° C. suspension, which is stirred for 18 hours. The suspension is then vacuum filtered, and the presscake dried at 120° C. for 16 hours. The yield of silica coated product is 355 grams. The material displays a weak red reflection color in bulk form, which is not visible in the reaction suspension.

Into a 3 liter Morton flask equipped with heating, stirring, and temperature control is added 1000 ml of demineralized water and 150 grams of the silica coated intermediate obtained from the previous coating procedure. While stirring at a constant rate, the suspension is heated to the 74° C. set point, and the pH was adjusted to 1.6. Next, 23.5 grams of an 18% SnCl$_4$5H$_2$O solution is pumped into the suspension over 15 minutes while maintaining the pH at 1.6. The suspension is allowed to stir for 30 minutes following the addition.

While maintaining the temperature, stirring rate and pH of the suspension at the values for the previous reagent addition, an aqueous solution of 40% TiCl$_4$ is added to the suspension at a rate of 0.65 ml per minute. During the addition, small aliquots of the suspension get spread onto a black glass plate to monitor the luster and color of the pigment platelets. After 100 ml of TiCl$_4$ solution is added, there is still no increase in the luster of the particles, the addition is terminated, and the suspension filtered and the product dried at 120° C. The yield of product is 170 grams. The product is compared to the singly coated starting material (Timica Sparkle) as a drawdown of 3% pigment in nitrocellulose lacquer. The dried paint displays inferior luster to the starting material, and severe particle agglomeration.

EXAMPLE 3

A slurry of 420 grams of iron oxide coated borosilicate flake (G270L, REFLECKS™ Blazing Bronze, Engelhard Corporation), 590 mls. of isopropanol, 45 mls. of water, and 5.6 mls. of 29% NH$_4$OH solution is heated to 60° C. and stirred in a reaction vessel. Then, 46.5 grams of tetraethoxysilane is added to the slurry and stirred at that temperature for 20 hours. The slurry is vacuum-filtered and the product dried for 24 hours at 135° C., yielding 432.2 grams. A slurry of 416 grams of the aforementioned silica coated product in 756 mls. of water is stirred in a reaction vessel and heated to 79° C. The slurry pH is adjusted to 1.5. An aqueous solution containing 8.93 grams of SnCl$_4$5H$_2$O is pumped into the slurry over a 2 hour period while maintaining the pH at 1.5 with 10% Na$_2$CO$_3$ solution. After the addition is completed, the slurry temperature is raised to 82° C. and the pH is adjusted to 3.0 with 10% Na$_2$CO$_3$ solution. An aqueous 39% FeCl$_3$ solution is pumped in at 0.4 g/min while controlling the pH at 3.0 with the 10% Na$_2$CO$_3$ solution. The addition is stopped after 81.8 grams of the iron solution is added, and the slurry is then vacuum-filtered, the presscake washed with water, and then calcined for 90 minutes at 650° C.

Both the calcined product and base iron oxide-coated glass flake are compared as drawdowns of 12% powder in nitrocellulose lacquer. The calcined product is seen to exhibit a bronze shade with superior reflectivity and chromaticity to that of the base material.

EXAMPLE 4

A slurry of 420 grams of titanium dioxide coated borosilicate flake (G130L, REFLECKS™ Pinpoints of Pearl, Engelhard Corporation), 590 mls. of isopropanol, 45 mls. of water, and 5.6 mls. of 29% NH$_4$OH solution is heated to 60° C. and stirred in a reaction vessel. Then, 46.5 grams of tetraethoxysilane is added to the slurry and stirred at that temperature for 20 hours. The slurry is vacuum-filtered and the product dried for 24 hours at 135° C., yielding 432.2 grams. A slurry is prepared with 416 grams of the aforementioned silica coated product in 756 mls. of water, stirred in a reaction vessel and heated to 79° C. The slurry pH is adjusted to 1.5. An aqueous solution containing 8.93 grams of SnCl$_4$5H$_2$O is pumped into the slurry over a 2 hour period while maintaining the pH at 1.5 with 10% Na$_2$CO$_3$ solution. After the addition is complete, the slurry temperature is raised to 82° C. and the pH adjusted to 3.0 with 10% Na$_2$CO$_3$ solution. An aqueous 39% FeCl$_3$ solution is pumped in at 0.4 g/min while controlling the pH at 3.0 with 10% Na$_2$CO$_3$ solution. The addition is stopped after 81.8 grams of the iron solution is added, and the slurry is vacuum-filtered, the presscake washed with water, and calcined for 90 minutes at 650° C.

Both the calcined product and base iron oxide-coated glass flake are compared as drawdowns of 12% powder in nitrocellulose lacquer. The calcined product is seen to exhibit a bronze shade with superior reflectivity and chromaticity to that of the base material.

EXAMPLE 5

The following samples with non-zero layers represent computer simulations on the specific pigments described employing a 1 micron thick glass substrate. Samples with zero thicknesses for the silica layer and second TiO$_2$ layer are simulations of singly coated commercial pigments and serve as comparisons to the inventive samples. Samples 1 and 3 represent pigments that were prepared as described above. The actual properties measured and observed agreed with the simulated properties.

TABLE 1

| Sample No. | Target Color | First TiO$_2$ Layer, Nm[1] | Silica Layer, Nm[1] | Second TiO$_2$ Layer, Nm[1] | L* | a* | b* |
|---|---|---|---|---|---|---|---|
| 1 | White | 62 | 80 | 57 | 90.6 | −2.6 | 0.2 |
| 2 | White | 62 | 0 | 0 | 75.5 | 0.6 | 0.4 |
| 3 | Yellow | 62 | 80 | 87 | 84.2 | −1.2 | 54.0 |
| 4 | Yellow | 87 | 0 | 0 | 64.3 | 5.2 | 37.6 |
| 5 | Yellow[2] | 69 | 113 | 69 | 84.3 | −4.0 | 67.5 |
| 6 | Red | 62 | 80 | 101 | 74.7 | 33.5 | −0.7 |
| 7 | Red | 101 | 0 | 0 | 51.4 | 28.3 | 0.1 |
| 8 | Violet | 62 | 40 | 129 | 57.1 | 54.0 | −53.3 |
| 9 | Violet | 111 | 0 | 0 | 44.6 | 36.2 | −36.7 |
| 10 | Blue | 62 | 40 | 144 | 59.0 | 1.1 | −56.3 |
| 11 | Blue | 128 | 0 | 0 | 51.7 | −0.3 | −45.4 |
| 12 | Green | 62 | 40 | 172 | 78.1 | −44.2 | 0.5 |
| 13 | Green | 157 | 0 | 0 | 70.9 | −19.1 | −0.5 |
| 14 | Green[2] | 155 | 254 | 155 | 72.1 | −58.8 | −1.2 |

[1] ±5 nm
[2] ¼ wave pigments
The L*, a* and b* data are for normal incidence and specular reflection.

EXAMPLE 6

The following data represent computer simulations on the specific pigments optimized with respect to C* magnitude and employing a 1 micron thick glass substrate. All samples represent pigments that were prepared by the sol-gel technique as described above. The actual properties measured and observed agreed with the simulated properties.

TABLE 2

| Sample No. | Target Color | First TiO$_2$ Layer, Nm[1] | Silica Layer, Nm[1] | Second TiO$_2$ Layer, Nm[1] | 0° L* | 0° a* | 0° b* | 0° C.* |
|---|---|---|---|---|---|---|---|---|
| 1 | Yellow | 85 | 80 | 85 | 81.0 | 1.0 | 83.0 | 83.0 |
| 2 | Yellow | 85 | 40 | 95 | 80.0 | −3.0 | 75.0 | 75.1 |
| 3 | Orange | 102 | 40 | 102 | 64.0 | 32.0 | 34.0 | 46.7 |
| 4 | Red | 102 | 40 | 112 | 53.0 | 50.0 | 1.0 | 50.0 |
| 5 | Violet | 113 | 80 | 115 | 43.2 | 66.1 | −24.9 | 70.6 |
| 6 | Blue | 60 | 40 | 30 | 47.0 | 3.0 | −60.0 | 60.1 |
| 7 | Blue | 50 | 40 | 36 | 49.3 | 2.7 | −59.2 | 59.3 |

[1] ±5 nm

EXAMPLE 7

The following data represent computer simulations on specific pigments employing a 1 micron thick glass substrate.

TABLE 3

| Normal Color | First TiO$_2$ Layer, Nm[1] | Silica Layer, Nm[1] | Second TiO$_2$ Layer, Nm[1] | 0° L* | 0° a* | 0° b* | 0° C.* |
|---|---|---|---|---|---|---|---|
| White | 56 | 80 | 56 | 90.7 | −6.0 | −0.2 | 6.00 |
| White | 56 | 78 | 57 | 90.7 | −6.2 | −0.1 | 6.20 |
| White | 56 | 76 | 58 | 90.7 | −6.6 | −0.1 | 6.60 |
| White | 56 | 74 | 59 | 90.6 | −6.9 | 0.03 | 6.90 |
| White | 56 | 72 | 60 | 90.5 | −7.2 | 0.13 | 7.20 |
| White | 56 | 70 | 60 | 90.3 | −7.7 | −0.33 | 7.71 |
| White | 56 | 68 | 61 | 90.1 | −7.9 | −0.27 | 7.91 |
| White | 56 | 66 | 62 | 89.9 | −8.2 | −0.24 | 8.20 |
| White | 60 | 40 | 65 | 86.0 | −10.0 | −1.0 | 10.0 |
| Yellow | 85 | 78 | 86 | 80.4 | 0.78 | 84.7 | 84.7 |
| Yellow | 85 | 76 | 87 | 80.2 | 1.15 | 85.7 | 85.7 |
| Yellow | 85 | 74 | 87 | 80.2 | 0.73 | 86.1 | 86.1 |
| Yellow | 85 | 72 | 88 | 80.3 | 0.35 | 86.2 | 86.2 |
| Yellow | 85 | 70 | 89 | 80.0 | 0.97 | 85.8 | 85.8 |
| Yellow | 85 | 68 | 89 | 80.0 | 0.70 | 85.5 | 85.5 |
| Yellow | 85 | 66 | 90 | 80.0 | 0.47 | 85.0 | 85.0 |
| Red | 102 | 80 | 104 | 49.0 | 57.0 | 3.0 | 57.1 |
| Red | 205 | 80 | 205 | 75.0 | 43.0 | 6.0 | 43.4 |
| Violet | 156 | 40 | 28 | 42.0 | 61.0 | −64.0 | 88.4 |
| Violet | 60 | 40 | 19 | 31.0 | 55.0 | −56.0 | 78.5 |
| Violet | 35 | 40 | 30 | 33.0 | 54.0 | −51.0 | 74.3 |
| Violet | 40 | 40 | 30 | 30.0 | 60.0 | −67.0 | 89.9 |
| Violet | 45 | 40 | 27 | 27.0 | 67.0 | −71.0 | 97.6 |
| Violet | 111 | 80 | 111 | 38.0 | 71.0 | −51.0 | 87.4 |
| Blue | 55 | 40 | 33 | 48.3 | 2.6 | −60.3 | 60.4 |
| Green | 157 | 80 | 157 | 77.8 | −59.8 | 0.2 | 59.8 |
| Green | 156 | 40 | 175 | 71.0 | −45.0 | −2.0 | 45.0 |

[1] ±5 nm

EXAMPLE 8

The pigment of this invention can be formulated into a powder eye shadow by thoroughly blending and dispersing the following materials:

| Ingredients | Wt. Parts |
|---|---|
| Mearltalc TCA ® (Talc) | 18 |
| Mearlmica ® SVA (Mica) | 20 |
| Magnesium Myristate | 5 |
| Silica | 2 |
| CLOISONNE ® Red 424C (Red TiO$_2$-coated mica) | 20 |
| CLOISONNE ® Violet 525C (Violet TiO$_2$-coated mica) | 13 |
| CLOISONNE ® Nu-Antique Blue 626CB (TiO$_2$-coated mica/iron oxide-coated mica) | 2 |
| CLOISONNE ® Cerise Flambé 550Z (iron oxide-coated mica) | 2 |
| Preservatives & Antioxidant | q.s. |

Then 7 parts of octyl palmitate and 1 part of isostearyl neopentanoate are heated and mixed until uniform, at which time the resulting mixture is sprayed into the dispersion and the blending continued. The blended material is pulverized and then 5 parts of Cloisonne Red 424C and 5 parts of the pigment of this invention added and mixed until a uniform powder eye shadow is obtained.

EXAMPLE 9

The pigment can be formulated into a lipstick by placing the following amounts of the listed ingredients into a heated vessel and raising the temperature to 85.+−0.3° C.:

| Ingredients | Wt. Parts |
| --- | --- |
| Candelilla Wax | 2.75 |
| Carnauba Wax | 1.25 |
| Beeswax | 1.00 |
| Ceresine Wax | 5.90 |
| Ozokerite Wax | 6.75 |
| Microcrystalline Wax | 1.40 |
| Oleyl Alcohol | 3.00 |
| Isostearyl Palmitate | 7.50 |
| Isostearyl Isostearate | 5.00 |
| Caprylic/Capric Triglyceride | 5.00 |
| Bis-Diglycerylpolyalcohol Adipate | 2.00 |
| Acetylated Lanolin Alcohol | 2.50 |
| Sorbitan Tristearate | 2.00 |
| Aloe Vera | 1.00 |
| Castor Oil | 37.50 |
| Red 6 Lake | 0.25 |
| Tocopheryl Acetate | 0.20 |
| Phenoxyethanol, Isopropylparaben, and butylparaben | 1.00 |
| Antioxidant | q.s. |

A mixture of 13 parts of the pigment of this invention and 1 part of kaolin are added and mixed until all of the pigment is well dispersed. Fragrance is added as desired and mixed with stirring. The resulting mixture is poured into molds at 75.+−0.5° C., allowed to cool and flamed into lipsticks.

Various changes and modifications can be made in the present invention without departing from the spirit and scope thereof. The various embodiments which were illustrated herein were set forth in order to illustrate the invention but were not intended to limit it.

What is claimed is:

1. A multilayer effect pigment comprising:
    a transparent substrate having a first layer of titanium dioxide thereon, said first layer having a thickness of 205±5 nm;
    a second layer of silicon dioxide on said first layer, said second layer of silicon dioxide having a thickness of 80±5 nm; and
    an outermost titanium dioxide layer placed on said second layer and having a thickness of 205±5 nm, said pigment being red, whereby the pigment is not a quarter-wave stack.

* * * * *